United States Patent [19]

Übelein et al.

[11] Patent Number: 6,114,822
[45] Date of Patent: Sep. 5, 2000

[54] METHOD FOR THE CONTACTLESS APPROACH OF THE LOWER STOP POSITION OF A MOTOR VEHICLE WINDOW OPERATED BY EXTRANEOUS FORCE

[75] Inventors: Jörg Übelein, Grub am Forst; Roland Kalb, Rossach, both of Germany

[73] Assignee: Brose Fahrzeugteile GmbH & Co. KG Coburg, Coburg, Germany

[21] Appl. No.: 09/230,976

[22] PCT Filed: Aug. 18, 1997

[86] PCT No.: PCT/DE97/01822

§ 371 Date: Feb. 4, 1999

§ 102(e) Date: Feb. 4, 1999

[87] PCT Pub. No.: WO98/08148

PCT Pub. Date: Feb. 26, 1998

[30] Foreign Application Priority Data

Aug. 16, 1996 [DE] Germany .......................... 196 32 910

[51] Int. Cl.$^7$ .................................................. G05B 5/00
[52] U.S. Cl. ......................... 318/469; 318/286; 318/466; 318/468; 318/266
[58] Field of Search .................... 318/430–480, 318/260–284; 49/352

[56] References Cited

U.S. PATENT DOCUMENTS

| | | | |
|---|---|---|---|
| 5,170,108 | 12/1992 | Peterson et al. | 318/469 |
| 5,399,950 | 3/1995 | Lu et al. | 318/565 |
| 5,483,135 | 1/1996 | Parks | 318/469 |
| 5,539,290 | 7/1996 | Lu et al. | 318/565 |
| 5,740,630 | 4/1998 | Medebach | 49/352 |

FOREIGN PATENT DOCUMENTS

| | | |
|---|---|---|
| 59-045515 | 3/1984 | European Pat. Off. . |
| 63-101912 | 5/1988 | European Pat. Off. . |
| 0270837 | 6/1988 | European Pat. Off. . |
| 0331142 | 9/1989 | European Pat. Off. . |
| 19514954 | 12/1995 | Germany . |
| 19536207 | 4/1996 | Germany . |
| 97/12108 | 4/1997 | WIPO . |

*Primary Examiner*—Paul Ip
*Attorney, Agent, or Firm*—Christie, Parker & Hale, LLP

[57] ABSTRACT

The invention relates to a method for contactless approach of a lower stop position of a motor vehicle window pane operated by extraneous force using a sensor device which during lowering of the window pane generates path-dependent signals and forwards them to an electronic evaluation unit in which the sensor signals are counted. During two separate phases (A) and (B) system deficiencies of a window raising mechanism are compensated and the pane is lowered. On reaching a certain counting state which lies in front of the position of the fixed contactless stop, a drive is switched off. The first phase (A) and the second phase (B) of the adjustment movement of the drive are separated by a boundary value (2) which reflects a system state of window winding raising mechanism so that the sensor signals of the first phase (A) can be associated with compensating cable slack and the sensor signals of the second phase (B) can be associated with the actual movement of the window. For determining the slowing-down path of the window pane which is to be expected the operating voltage of the drive is used in addition to the lowering speed of the window.

9 Claims, 1 Drawing Sheet

METHOD FOR THE CONTACTLESS APPROACH OF THE LOWER STOP POSITION OF A MOTOR VEHICLE WINDOW OPERATED BY EXTRANEOUS FORCE

The invention relates to a method for the contactless approach of the lower stop position of a motor vehicle window operated by extraneous force according to the preamble of patent claim 1. It ensures that even with changed influencing factors, such as varying operating voltage, changed friction conditions, ageing of the technical system, a contactless stop position is reached and held without noticeably restricting the pane stroke which is available. The method is also in a position to compensate relevant tolerances of the vehicle doors, window raising mechanism and motor (deviations in the motor characteristic line).

According to the usual structural requirements when a window pane is in the lowest possible position the top edge of the window pane should as far as possible no longer protrude from the window shaft of the vehicle body. This generally requires the window pane to move down into the immediate vicinity of the lower mechanical stop. The contactless approach of the lower stop, also called 'Soft-Stop' has the advantage that the otherwise normal noises which are connected with the pane striking the stop are avoided. Furthermore the window raising system is stressed less heavily which allows weight-saving dimensions to be used.

Methods are known for the contactless lowering of a window pane of a motor vehicle into it lower end positions by evaluating sensor signals of a motorised drive which are supplied to an electronic evaluation unit. The electronic evaluation unit uses the sensor signals as counting pulses whereby a certain pane position is allocated to each sum value. In order to avoid a collision with the lower mechanical stop as the window pane is lowered, it is generally necessary owing to the slowing-down behaviour of the displacement system whereby the window pane still also moves down slightly even after the drive has been switched off, to switch off the drive just before the window pane reaches the lower ideal position.

AS a result of the production-conditioned tolerances when fixing the electronically controllable stroke it is necessary to proceed from the shortest of the possible displacement paths available since otherwise there is the risk of collision with the lower stop. Thus the stroke which is actually available is not fully utilised. Where the distance from the lower stop is measured too short this leads during travel as a result of further lowering movements, for example through vibrations or shocks, to impact noises.

The known solutions are not in a position to detect and compensate changed influencing factors. This relates both to the system deficiency which increases as the system ages and to temporary condition changes such as increased or reduced operating voltage or friction conditions of the window pane changed through temperature fluctuations and/or the effects of dampness. In the event of increased cable loosening the drive must use up an increasingly greater positioning path for compensation which is no longer available for carrying out a window movement. That is the overall number of the counting pulses (signals) which represents the pane stroke between the upper and lower end position is to an increasingly greater part allocated to setting movements of the drive which lead to displacement movements of the window pane. Thus the window pane can no longer drop down completely in the shaft.

From DE 195 14 954 A a method is known for controlling the movement of vehicle windows which detects the window position and on reaching the end positions (when the window is fully closed or fully opened) the blocking of the motor. On approaching the end positions the actual position values are compared with earlier position values (previous displacement cycles) and the stroke restriction is adapted when required. Thus approaching the end positions is possible with secondary current but the features of the blocking state, more particularly the high system voltage, are not positively affected thereby. Minimising the tensioning of the window raising device can hereby not be reached.

On the other hand the friction conditions and the displacement speed of the window pane which is dependent on the operating voltage and the motor characteristic line (which can differ sharply from motor to motor) have a considerable effect on the slowing-down behaviour. The lowermost positions of the window pane which can be reached each time can thereby differ from each other.

To compensate for errors when counting the generated sensor pulses it is known to undertake a so-called secondary standardisation of the counting state on reaching the upper closing position. Such counting errors can occur when signals of a slowing down path after switching off the motor are no longer detected.

The object of the invention is to provide a method for the contactless approach of the lower stop position of a motor vehicle window pane operated by extraneous force which automatically compensates changing influence factors, such as ageing of the technical system, fluctuating friction conditions of the window pane, mean variations of the motor characteristic line and fluctuations of the operating voltage, with simple means whereby the stroke which is available through the structural design is utilised substantially to the full extent. A collision with the lower stop is likewise to be reliably avoided where necessary.

According to the invention this is achieved through the features of claim 1. The sub-claims provide advantageous designs of the invention.

According to this the path-dependent sensor signals during control of the drive towards lowering in a first phase of the adjustment movement which has still not resulted in any displacement of the window pane, are allocated to compensate the system deficiencies of the window raising mechanism. Only the sensor signals of a second phase of the adjustment movement of the drive are associated with the lowering path of the window pane and through evaluation in the electronics unit are used to determine the position of the window pane. During the designated second phase of the adjustment movement of the drive the slowing down path of the window pane which is to be expected is calculated on the basis of its lowering speed and/or operating voltage of the on-board power supply in order to determine the latest possible switch-off point for the drive. That is taking into consideration the slowing down of the window pane the switch off point is to be found which reliably just avoids the pane running onto the mechanical stop. The slowing down behaviour is inter alia influenced by the slowing down of the drive assembly, the mass inertia forces of the moving parts, more particularly the window pane, and the friction conditions in the pane guides. On reaching the switch-off point, thus the pane position which lies by the amount of the slowing-down path in front of the position of the fixed contactless lower stop the control of the window raising drive is stopped. In order to secure this position where necessary the window raising drive can be automatically controlled in the lift direction until the system deficiencies of the displacement mechanism caused by the displacement of the window pane into the previous direction of movement are compensated. The window raising mechanism is thereby tensioned in the window-raising direction and the position of the pane is secured against unintended lowering e.g. as a result of shocks or vibrations.

The slowing-down path can be continuously calculated in the entire area of the actual window movement; this is however necessary at least after understepping a lower intermediate position of the window pane which is to be fixed. Calculating the trend of the switch off point of the drive is preferably carried out on the basis of several calculation values of the slowing down path.

No generally valid mathematical equation can be given for calculating the slowing-down path since the sum of all the influencing factors is very large and their dependencies on each other very complex. Therefore an empirical investigation is to be carried out set up for each relevant case of use which leads to a provisional model taking into account the essential influencing factors. For this one changes for example the operating voltage, uses motors with different characteristic lines and simulates different climate conditions by varying the temperature and humidity. The different displacement speeds resulting therefrom can lead for example linked with the measured values of the temperature and operating voltage to an evaluation field (matrix) which allows an advanced calculation of the slowing down path with sufficiently good reliability.

In order to judge the system state, i.e. whether a system deficiency does or does not exist, it is advantageous to use the period length of a drive shaft (e.g. motor shaft) or the current pick-up of the electrical drive as the measured value. The period length can easily be detected by evaluating echo signals which are generated on an echo element by a magnet fixed on the drive shaft. Whilst a system deficiency exists the motor turns faster and close to its idling speed which is connected with a comparatively small period length. Under load, thus after compensation of the system deficiency the motor is braked and the period length extended to an adequate amount. Since the state of an electric motor can be judged very effectively by the current pick-up the current strength is also well suited as measured value. The faster the motor turns so the smaller its current pick-up.

In order to be able to detect sufficiently clearly the boundary area between the drive movements which compensate a system deficiency and the drive movements which cause a displacement of the window pane, even with changing influencing factors (e.g. lowering of the operating voltage), the switch-off criterion (boundary value) is generated on the basis of at least one previous measured value. An electronic filter ensures that not just any small change in the measured value leads to the switching off of the drive. Only when the measured value which is to be evaluated deviates by a fixed absolute or relative (percentage) amount from the comparison value does it lead to the generation of the switch-off signal.

An embodiment of the invention will now be explained in further detail with reference to the drawings in which.

The present example proceeds from a completely closed window pane whose upper edge is pressed by the window raising device into the sealing area; the window pane is located at rest. At time $t_1$ the drive of the window raising mechanism is activated in the window-lowering direction.

Figure 1:
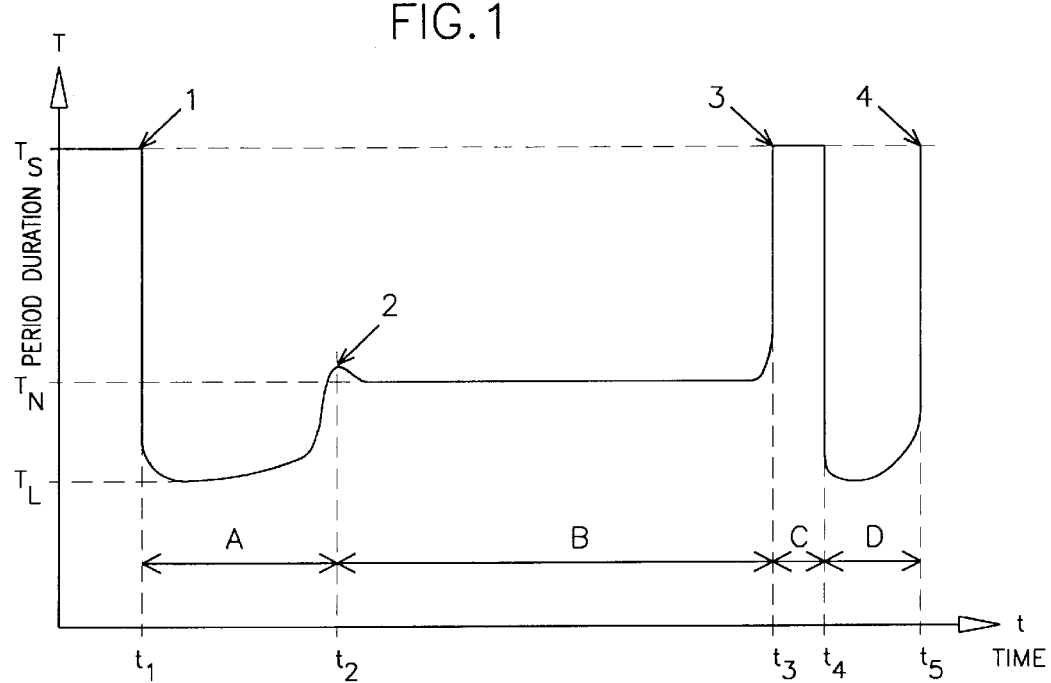
FIG. 1 shows a diagrammatic curved path of a window lowering from the closed position into the lower contactless stop position in the T-t diagram whereby T is the period length of a drive shaft, more particularly a motor shaft, and t is the time.
Figure 2:
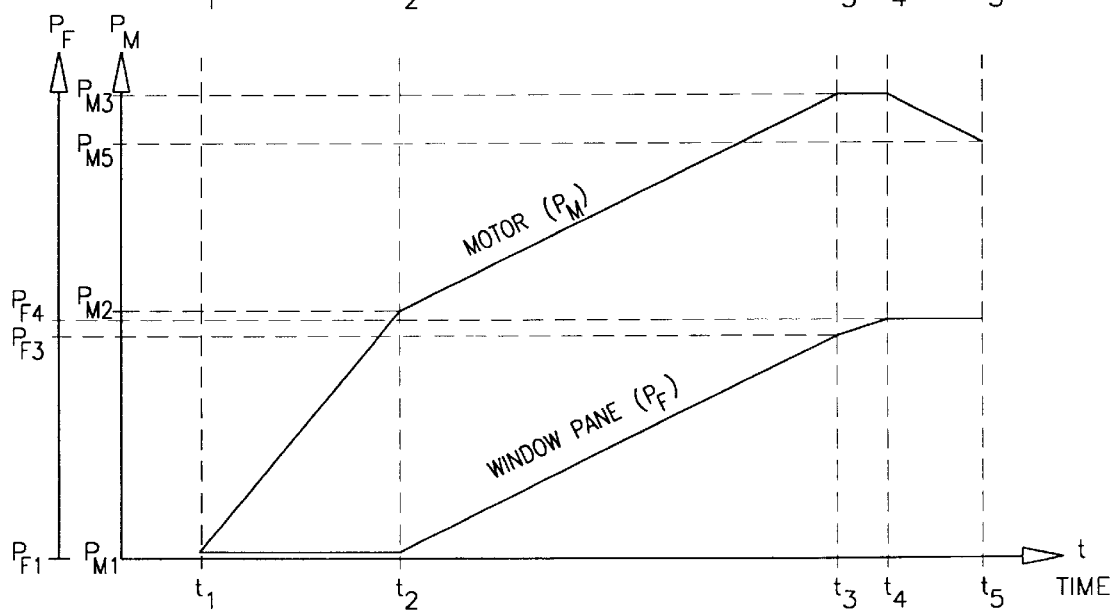
FIG. 2 is a diagrammatic illustration comparing the path of the window pane position and the position of the drive (motor) during the closing position into the lower contactless stop position.

Since this drive movement controlled in the lowering sense represents a change of rotary direction relative to the previous stroke movement which led to the closing of the window pane, a comparatively large system deficiency exists in the window raising mechanism. Therefore a lowering of the window pane is not directly connected with the start point 1 (of FIG. 1) of the drive in the lowering direction. In a first phase of the drive movement (area A) the system deficiency is compensated. This is also shown in FIG. 2 with the rising path of the curve of the drive (rise of the motor position counter state $P_M$; upper curve) in area A between $t_1$ and $t_2$ from position $P_{M1}$ to $P_{M2}$ whilst the window pane is jarred in the same area A in its closing position $P_{F1}$.

AS a result of the lack of mechanical resistance the drive accelerates in the shortest time to its idling speed which corresponds to the idling period length T. Shortly before reaching the time point $t_2$ the system deficiency is compensated and the window raising mechanism begins again to tension but first however without causing any movement of the window pane. Point 2 characterises a local maximum of a typical curved path which shows the transition between adhesive friction and sliding friction of the moving window pane and thus the start of the window-lowering movement. All the movement signals generated up to now by the drive or a drive shaft are associated with the system deficiency. Only the signals of area B are connected to a window movement and are evaluated accordingly. In this area each drive movement leads to a corresponding displacement of the window pane. As a result of the change in the motor position from $PM_{M2}$ to $P_{M3}$ the window pane is lowered from position $P_{F1}$ to position $P_{F3}$. The drive is levelled at its nominal speed with the period length $T_N$.

The drive movement is stopped at time point $t_3$ if as a result of the slowing down path of the window lowering calculated in area B the window threatens to run onto the lower stop. As a result of the conditions already explained there is a further lowering of the window pane so that the window pane in area C continues its displacement path from $P_{F3}$ to $P_{F4}$ whilst the drive remains in position $P_{M3}$.

In order to secure the position of the window against further lowering the control electronics cause at time point $t_4$ a reversal of the rotary direction which compensates for the system deficiencies caused by the previous lowering movement. This takes place on the same principle as already described for compensating the system deficiencies in the lowering direction. The position $P_{M3}$ of the drive is thereby returned to the position $P_{M5}$; the window pane however remains in its position $P_{F4}$. Switching off the drive at point 4 completely compensates for the system deficiencies of the area D and the window pane is under mechanical tension in the window raising direction.

In order to be able to determine with sufficient accuracy the time point $t_2$ which separates the area A of the system deficiency compensation from the area B of genuine window movement a boundary value must be defined for the measured value describing the system state. The boundary value is preferably calculated on the basis of at least one of the previously determined measured values in order to detect therewith all the factors influencing the system (temperature, moisture, ageing, operating voltage). Through an algorithm recorded in the electronics unit it is determined by which absolute or relative amount the next measured value may deviate. When this value is exceeded or understepped the system deficiencies are regarded as compensated.

LIST OF REFERENCE NUMERALS

| | |
|---|---|
| 1 | Starting point in lowering direction starting from upper closing position |
| 2 | Transition point from adhesive friction to sliding friction |
| 3 | Point of switching off drive and start of slowing down of window pane |
| 4 | Point of switching off drive |
| A | Area of system deficiency in lowering direction |
| B | Area of window lowering |
| C | Area of slowing down of window pane |
| D | Area of system deficiency in raising direction |
| $P_F$ | Position of window pane |
| $P_{F1}$ | Position of window pane in upper closing position of window pane |
| $P_{F3}$ | Position of window pane at point of switching off drive |
| $P_{F4}$ | Position of window pane at end of slowing down area |
| $P_M$ | Position of drive (e.g. number of motor revolutions) |
| $P_{M1}$ | Position of drive in upper closing position of window pane |
| $P_{M2}$ | Position of drive with practically complete compensation of system deficiency in lower direction |
| $P_{M3}$ | Position of drive at point of switching off drive |
| $P_{M5}$ | Position of drive at point of switching off drive after compensating system deficiencies in raising direction |
| T | Period length |
| $T_L$ | Period length |
| $T_L$ | Period length at idling speed |
| $T_N$ | Period length at nominal speed |
| $T_S$ | Period length with motor stationary |
| t | Time |
| $t_1$ | Time point of activation of drive in window lowering direction |
| $t_2$ | Time point of start of window lowering |
| $t_3$ | Time point of switching off drive |
| $t_4$ | Time point of changing rotary direction from lowering to raising |

What is claimed is:

1. A method for a contactless approach of a lower stop position of a motor vehicle window pane operated by extraneous force comprising:

generating path-dependent sensor signals during the lowering of the window pane by using a sensor device;

forwarding the sensor signals to an electronic evaluation unit in which the sensor signals are counted;

compensating for system deficiencies of a window raising mechanism during a first phase (A) of the adjustment movement of a drive;

lowering the window pane during a second phase (B) of the adjustment movement of the drive;

switching the drive off on reaching a certain count which lies, by the amount of a slowing-down path to be expected based on the lowering speed of the window pane, in front of a position of a fixed contactless stop;

wherein the first phase (A) and the second phase (B) of the adjustment movement of the drive are separated by a boundary value of a measured value reflecting a system state of the window raising mechanism so that the sensor signals of the first phase (A) can be associated with compensating cable slack and the sensor signals of the second phase (B) can be associated with the actual window pane movement; and wherein an expected slowing-down path of the window pane is determined by using at least one of the operating voltage of the drive or the lowering speed of the window pane.

2. The method according to claim 1 wherein the measured value used is a period length of a drive shaft and the boundary value between the phase (A) and the phase (B) used is a local maximum of the period length.

3. The method according to claim 1 wherein the measured value used is a current pick-up of an electric drive and the boundary value between the phase (A) and phase (B) used is a local maximum of an electric current.

4. The method according to claim 1 wherein the boundary value is generated from at least a previously detected measured value and wherein the boundary value deviates by a determined amount from a last measured value.

5. The method according to claim 1 wherein a counting state associated with the pane position is undertaken through approaching the upper closing position of the window pane during operation of the window raising mechanism and after a fixed number of operations of the window raising mechanism.

6. The method according to claim 1 wherein the slowing-down path is calculated continuously at least after understepping a lower intermediate position of the window pane.

7. The method according to claim 6 wherein the switch off point for the drive is fixed on the basis of a trend calculation comprising several calculation values of the slowing-down path.

8. The method according to claim 1 wherein the window raising drive is controlled automatically in the raising direction until the system deficiencies of the displacement mechanism caused by the displacement of the window pane into the previous direction of movement are compensated.

9. The method according to claim 2 wherein the drive shaft is the drive shaft of an electric motor.

* * * * *